June 25, 1946.  F. J. MOORE  2,402,830
CONVERSION OF HYDROCARBONS
Filed Feb. 12, 1942
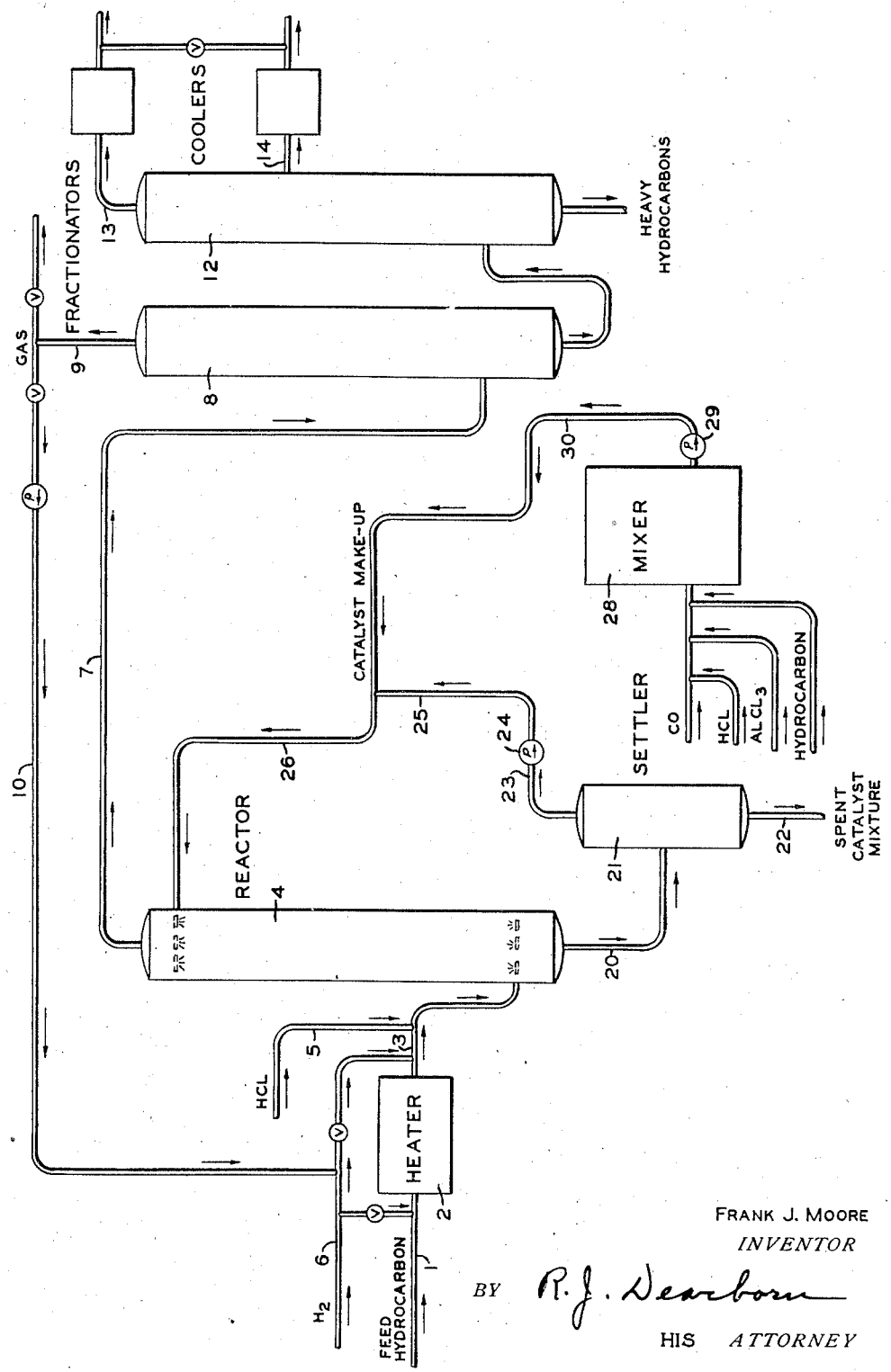
Frank J. Moore
INVENTOR
BY R. J. Dearborn
HIS ATTORNEY Patented June 25, 1946

2,402,830

UNITED STATES PATENT OFFICE 2,402,830

CONVERSION OF HYDROCARBONS

Frank J. Moore, Beacon, N. Y., assignor to The Texas Company, New York, N. Y., a corporation of Delaware Application February 12, 1942, Serial No. 430,575

8 Claims. (Cl. 260—683.5)

This invention relates to the conversion of hydrocarbons and has to do with the preparation of a fluid catalyst suitable for effecting isomerization of hydrocarbons, and the employment of such a catalyst for this purpose.

The invention contemplates effecting isomerization of hydrocarbons by the action of an active isomerization catalyst formed by reacting a metallic halide and a hydrocarbon in the presence of an oxygen-containing gas under conditions so as to form an oxygenated hydrocarbon-metallic halide complex mixture.

More specifically the invention contemplates subjecting a feed hydrocarbon to contact with a fluid catalyst prepared by reacting aluminum halide and a saturated hydrocarbon in the presence of a small amount of carbon monoxide under conditions so as to form a mixture of oxygenated hydrocarbon and non-oxygenated hydrocarbon-metallic halide complexes containing in addition some free aluminum halide. The feed hydrocarbon and fluid catalyst mixture are maintained under isomerizing conditions advantageously in the presence of an activator capable of affording hydrogen halide so as to cause substantial conversion into isomerized hydrocarbons. Advantageously the reaction is carried out in the presence of a substantial amount of extraneous hydrogen or hydrogen containing gas so as to realize a relatively high conversion to isomerized hydrocarbons without the occurrence of substantial cracking or other side reactions, or while confining the occurrence of cracking and other side reactions to relatively small extent.

It is already known to effect conversion reactions including catalytic isomerization of hydrocarbons in the presence of a large amount of hydrogen. For example, d'Ouville, Evering and Oblad Patent 2,260,279 discloses effecting catalytic isomerization of hydrocarbons under a hydrogen pressure ranging from about 800 to 4000 pounds per square inch.

However, in accordance with the present invention the isomerization reaction may be carried out under relatively lower hydrogen pressure to obtain superior results from the standpoint of realizing high conversions to isomerized hydrocarbons while substantially avoiding cracking or at least materially reducing the amount of cracking occurring during the reaction.

The employment of a fluid catalyst mixture composed at least in substantial part of an oxygenated hydrocarbon-metallic halide complex as is contemplated by the present invention provides a superior catalyst for an isomerization reaction since under suitable conditions of operation straight-chain gasoline hydrocarbons such as normal pentane can be converted to a high yield of isoparaffin without excessive cracking into other products. With this type of catalyst cracking can be further inhibited if not substantially avoided by effecting the reaction in the presence of hydrogen or hydrogen containing gas. Moreover, as previously pointed out the amount of hydrogen so required is relatively small, thereby avoiding the necessity for employing reactors capable of withstanding high pressures.

In other words hydrogen appears more effective when used in conjunction with the catalyst of this invention than when used in conjunction with a catalyst consisting only of aluminum chloride, aluminum chloride-hydrocarbon complex or aluminum chloride mixed with such complex. The reason for this is not understood but nevertheless the phenomenon appears to exist as evidenced by the following data obtained in batch operations in which normal pentane was treated in the liquid phase with a fluid mixture comprising anhydrous aluminum chloride and aluminum chloride-hydrocarbon complex at a temperature of about 160° F. and for a period of about 4 hours.

In each instance a quantity of normal pentane was charged to a reaction vessel to which was also charged anhydrous aluminum chloride and aluminum chloride-hydrocarbon complex as well as some hydrogen chloride. The amount of anhydrous aluminum chloride charged was equivalent to 10% by weight of the normal pentane charged, while the hydrogen chloride amounted to 1% by weight of the normal pentane charged.

The aluminum chloride-hydrocarbon complex charged to the vessel amounted to about 13% by weight of the normal pentane charged and this complex comprised material accumulated from previous operations in which gasoline hydrocarbons were treated with aluminum chloride and hydrogen chloride under isomerizing conditions. It had a density of about 1.3 grams per cubic centimeter.

The data tabulated below were obtained in comparative runs: (1) employing the aluminum chloride plus aluminum chloride-hydrocarbon complex in the absence of carbon monoxide and hydrogen; (2) employing the aluminum chloride complex mixture in the presence of carbon monoxide but in the absence of hydrogen; (3) employing the aluminum chloride complex mixture in the presence of hydrogen but in the absence of carbon monoxide; and (4) employing the aluminum chloride complex mixture in the presence of both hydrogen and carbon monoxide.

| | Run | | | | |
|---|---|---|---|---|---|
| | A | B | C | D | E |
| Per cent carbon monoxide in the reaction mixture by weight of n-pentane | 0 | 0.4 | 0 | 0.2 | 0.4 |
| Pressure of hydrogen over the reaction mixture, pounds per square inch gauge | 0 | 0 | 210 | 210 | 40 |
| Composition of hydrocarbon product, per cent by weight: | | | | | |
| C₄ and lighter hydrocarbons | 69.4 | 53.0 | 64.9 | 0.4 | 6.9 |
| Isopentane | 20.1 | 23.6 | 23.0 | 39.0 | 69.1 |
| Normal pentane | 4.9 | 6.2 | 2.8 | 59.4 | 16.1 |
| Hydrocarbons heavier than n-pentane | 5.6 | 17.2 | 9.3 | 1.2 | 7.9 |
| Weight per cent normal pentane converted to isopentane and other hydrocarbons | 95.1 | 93.8 | 97.2 | 50.6 | 83.9 |
| Isopentane obtained as weight per cent of normal pentane converted | 21.0 | 25.2 | 24.6 | 77.0 | 82.5 |

As shown in this table when effecting isomerization in run A in the absence of either oxygenated compounds or hydrogen substantial cracking occurred as evidenced by the obtaining of 69.4% of C₄ and lighter hydrocarbons. While 95.1% of the normal pentane charged was actually converted, nevertheless only 21.0% of the converted material was isopentane.

Referring to run B in which carbon monoxide was charged so that oxygenated hydrocarbon-aluminum chloride complex existed in the reaction, it will be seen that the amount of cracking was reduced and the conversion to isopentane was somewhat higher, namely, 25.2% of the normal pentane converted.

In run C which was made in the absence of the oxygenated compounds, but maintaining a hydrogen pressure of 210 pounds, 64.9% of material corresponding to C₄ and lighter hydrocarbons was obtained and the yield of isopentane was still low, namely, 24.6% by weight of the normal pentane converted.

In run D where both hydrogen and carbon monoxide were used in the reaction the amount of cracking was very materially reduced since the material corresponding to C₄ and lighter hydrocarbons amounted to only 0.4% while the isopentane obtained amounted to 77.0% of the normal pentane converted.

In run E the amount of carbon monoxide employed was increased and at the same time the hydrogen pressure was reduced to 40 pounds. Under these conditions the treated hydrocarbons contained 69.1% isopentane or in other words the isopentane obtained amount to 82.5% of the total normal pentane converted.

In the foregoing experiments, for example, runs B, D and E, the oxygenated hydrocarbon complex was formed as an incident to or a part of the isomerization reaction in the reaction vessel. However, a preferred form of the invention involves preparing a preformed catalyst mixture containing the oxygenated compounds and then employing the preformed catalyst mixture in a separate reaction zone wherein the isomerization reaction is carried out. In such case the catalyst mixture could be prepared by reacting anhydrous aluminum chloride and a portion of the feed hydrocarbon in the presence of carbon monoxide and some hydrogen chloride in a separate vessel.

For example, normal pentane may be mixed with anhydrous aluminum chloride in the proportion of about 0.1 to 1.0 parts of anhydrous aluminum chloride to one part by weight of normal pentane. Carbon monoxide is injected into this mixture in an amount ranging from about 1 to 15% and preferably about 4 to 5% by weight of the aluminum chloride added. Hydrogen chloride is added to the mixture to the extent of about 1% by weight of the hydrocarbon. This mixture is then subjected to thorough stirring for a period of from about 1 to 4 hours while maintained at a temperature in the range about 70 to 200° F. thereby obtaining a fluid catalyst mixture comprising free aluminum chloride, aluminum chloride-ketone complex and aluminum chloride-hydrocarbon complex. This mixture is of brownish color and has a density of about 1.3 to 1.4 grams per cubic centimeter.

The preparation of the preformed complex catalyst mixture in the foregoing manner is thought to involve conversion of some normal pentane to isopentane with subsequent reaction between the resulting isopentane and carbon monoxide to form an additive compound such as

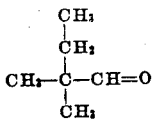

This additive compound undergoes rearrangement to form ketone compounds, such as

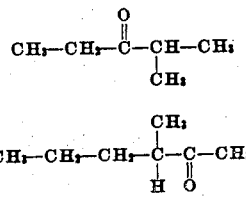

The preformed catalyst can then be transferred to a suitable reaction vessel wherein it is brought into contact with a stream of feed hydrocarbon and maintained under isomerizing conditions.

Instead of using pentane the catalyst can be prepared by reacting other paraffins, either iso or normal, with the aluminum chloride to prepare the preformed complex.

One method of employing the preformed catalyst is illustrated in the flow diagram shown in the accompanying diagram to which reference will now be made.

Referring to the drawing a feed hydrocarbon such as normal pentane is drawn from a source not shown and conducted through a pipe 1 to a heater 2 wherein it is heated to the desired reaction temperature which may range from about 100 to 300° F.

The heated feed is then passed through a pipe 3 to the lower portion of a reaction vessel 4.

In this instance the reaction vessel 4 advantageously comprises a tower maintained substantially filled with the preformed fluid catalyst mixture. The heated hydrocarbon feed being of lower density than the catalyst mixture rises upwardly through the catalyst and undergoes conversion during its upward flow through the reaction tower. Packing material may be provided in the tower for facilitating contact between feed hydrocarbon and catalyst.

Hydrogen chloride or other suitable activator capable of providing hydrogen halide is introduced from a source not shown through a pipe 5, or may be introduced into the charge stock prior to passage through the heater.

Where it is desired to carry out the reaction in the presence of hydrogen, hydrogen may be introduced from a source not shown through a pipe 6. Hydrogen may be commingled with the feed hydrocarbon prior to passage through the heater or if desired may be injected into the heated stream of feed hydrocarbon.

The reacted hydrocarbons accumulate in the upper portion of the tower and are continuously withdrawn therefrom through a pipe 7 and discharged into the lower portion of a fractionator or stripping tower 8. The tower 8 is advantageously operated so as to strip gaseous materials such as hydrogen and hydrogen chloride from the reacted hydrocarbons. The gas is discharged from the tower through a pipe 9 and may be all or in part returned through a pipe 10 for recycling to the reaction.

Other means may be provided for separating the hydrogen and hydrogen chloride from the reacted hydrocarbons and returning the separated gases individually or collectively, all or in part, to the reaction.

The stripped hydrocarbon reaction products are then conducted to a second tower 12 for the purpose of effecting further fractionation. This tower may be operated so as to take overhead a fraction comprising isoparaffins and unreacted feed hydrocarbon, the residual fraction withdrawn from the bottom of the tower comprising heavier hydrocarbons. On the other hand the fractionation may be effected so as to segregate fractions of any desired boiling range. For example, a relatively low boiling fraction may be removed through a pipe 13 while an intermediate fraction may be removed through a pipe 14. Obviously the fractionating operation may be adjusted in any manner desired to suit the particular needs of the operator.

Provision is advantageously made for continuous or intermittent withdrawal of used catalyst mixture from the bottom of the reactor 4 through a pipe 20. As indicated it is desirable to provide adequate settling space in both the bottom and top portions of the reaction tower so as to facilitate substantially complete separation between hydrocarbon and catalyst phases. It is, of course, contemplated that auxiliary settling chambers may be provided for this purpose if desired.

The catalyst phase drawn off through the pipe 20 may be conducted to a settler or accumulating drum 21. The heavier material settling out in the settler 21 may be drawn off through a pipe 22 and be discharged from the system or otherwise disposed of. This material may include heavy hydrocarbons or tarry material which it is desirable to discharge from the system.

The bulk of the catalyst phase accumulating in the settler 21 is drawn off through a pipe 23 by a pump 24 and returned to pipes 25 and 26 to the upper portion of the reaction tower 4.

Make-up catalyst is supplied from a mixer 28. Thus, aluminum chloride, carbon monoxide, hydrogen chloride and hydrocarbon may be added to the mixer 28 and the resulting mixture subjected to stirring and heating as previously described with reference to the preparation of the preformed catalyst mixture.

The resulting catalyst mixture is drawn off from the mixer by a pump 29 and conducted through a pipe 30 communicating with the pipe 26 leading to the top of the reaction tower 4.

While the continuous withdrawal of catalyst phase from the bottom of the reaction tower 4 has been described nevertheless it is contemplated that the catalyst mixture may remain in a substantially stationary condition within the tower for prolonged periods of time, only small amounts being drawn off intermittently and primarily for the purpose of removing accumulated heavy tarry material. In such operation the feed hydrocarbon rises in small particles or bubbles through the fluid body of catalyst. Also it is advantageous to maintain a relatively high ratio of catalyst phase to hydrocarbon feed undergoing conversion. For example, conditions may be adjusted so that 20 to 30 volumes of catalyst phase to one volume of feed hydrocarbon may be maintained within the reaction zone.

On the other hand it is contemplated that other types of reaction vessels may be employed, for example, an agitating vessel may be used wherein the feed hydrocarbon and catalyst mixture are subjected to agitation by mechanical stirring apparatus or by continuous forced circulation of the reaction mixture through or within the reaction vessel.

It is usually desirable to remove impurities from the hydrocarbon feed to the reaction. Such impurities may comprise aromatic hydrocarbons, olefinic hydrocarbons and sulfur compounds, etc. Removal of such impurities may be effected at least in substantial part by scrubbing the entering feed with a suitable scrubbing agent or by treating it with a chemical reagent, for example, treatment with aluminum chloride. One advantageous method of effecting removal is to subject the feed hydrocarbon to scrubbing with spent complex drawn off from the reaction zone. This complex is thus used to dissolve and remove impurities from the feed hydrocarbon.

While the treatment of normal pentane has been described in connection with the description of the flow diagram, nevertheless it is contemplated that the invention is applicable to the treatment of other gasoline hydrocarbons including normally gaseous hydrocarbons such as normal butane.

The temperature maintained during the isomerization reaction will depend upon the character of the feed hydrocarbon as well as upon other operating conditions, as for example, the proportion of hydrogen or other cracking inhibiting material employed in carrying out the reaction. When the charge consists essentially of normal hexane the temperature may range from about 125 to 300° F. If a hexane fraction is charged which contains substantial amounts of naphthene hydrocarbons somewhat higher temperatures are desirable, as for example, 200 to 350° F. since naphthenes tend to inhibit the conversion reaction and thus necessitate resorting to somewhat higher temperatures. However, the presence of such naphthenes is desirable from the standpoint of preventing to a still greater degree cracking and other undesired reactions.

If the charge consists essentially of normal butane the temperature may range from about 200 to 250° F.

The amount of hydrogen maintained in the reaction zone is advantageously sufficient to maintain a hydrogen pressure over the reaction mixture ranging from about 40 or 50 pounds to 200 or 300 pound per square inch gauge. Where the preformed catalyst is prepared by reacting with carbon monoxide in the proportion of about 1% by weight of the aluminum chloride, the hydrogen pressure maintained in the subsequent isomerization reaction is advantageously of the order of about 200 or in the range 200 to 300 pounds. With a catalyst which has been prepared using larger amounts of carbon monoxide a corresponding reduction in the hydrogen pressure is permissible. Thus, where the preformed catalyst is prepared by reacting with carbon monoxide in the amount of about 15% by weight of aluminum chloride, the hydrogen pressure can be reduced to about 5 to 40 pounds per square inch gauge.

While aluminum chloride has been specifically mentioned as a component of the isomerization catalyst in the above-mentioned examples, it is intended that other metallic halide catalysts may be employed such as aluminum bromide, zirconium chloride, boron trifluoride, antimony chloride, metallic mixed halides, such as $AlCl_2F$ and $AlF_2Cl$, etc., and mixed halides of beryllium, zinc, iron and aluminum and other metals and metalloids of groups 3 and 4 of the periodic system.

Suitable promoters may comprise besides hydrogen chloride, other hydrogen halides, carbon tetrachloride, alkyl chlorides, boron halides, carbon halides and halides of the other elements of the 4th group of the periodic table.

Carbon monoxide has been described above in connection with the preparation of the catalyst. However, it is contemplated that other suitable oxygen-bearing substances may be employed such as nitrogen oxides and the like which are capable of providing oxygen for the formation of a catalyst comprising metallic halide-oxygenated hydrocarbon complex.

Obviously many modifications and variations of the invention as above set forth may be made without departing from the spirit and scope thereof, and therefore only such limitations should be imposed as are indicated by the appended claims.

I claim:

1. A process for isomerizing saturated feed hydrocarbons which comprises maintaining within a reaction zone under isomerizing conditions a body of liquid isomerization catalyst consisting essentially of a liquid mixture of oxygenated hydrocarbon and non-oxygenated hydrocarbon-metallic halide complexes containing some free metallic halide in lesser proportion by weight than the complexes in said body, said complex mixture being preformed by reacting a metallic halide selected from the halides of metals of groups 2, 3, 4, 5 and 8 of the periodic system and a saturated paraffin hydrocarbon in the presence of a small amount of carbon monoxide and also in the presence of a small amount of hydrogen halide, subjecting said saturated feed hydrocarbons to contact with said preformed catalyst body in the presence of hydrogen halide, and effecting substantial isomerization of said hydrocarbons during said contact.

2. The process according to claim 1 in which the contact between the saturated feed hydrocarbons and the catalyst body is effected under a hydrogen pressure ranging from above atmospheric to about 300 pounds.

3. A process for isomerizing saturated feed hydrocarbons which comprises maintaining within a reaction zone under isomerizing conditions a body of liquid isomerization catalyst consisting essentially of a liquid mixture of oxygenated hydrocarbon and non-oxygenated hydrocarbon-aluminum chloride complexes containing some free aluminum chloride in lesser proportion by weight than the complexes in said mixture, said complex mixture having a specific gravity of about 1.3 to 1.4 grams per cubic centimeter and being preformed by reacting aluminum chloride and a saturated paraffin hydrocarbon in the presence of a small amount of carbon monoxide and also in the presence of a small amount of hydrogen chloride, subjecting said saturated feed hydrocarbons to contact with said preformed catalyst body in the presence of hydrogen chloride, and effecting substantial isomerization of said hydrocarbons during said contact.

4. The process according to claim 3 in which contact between saturated feed hydrocarbons and the catalyst body is effected under a hydrogen pressure ranging from substantially above atmospheric to about 300 pounds.

5. A continuous process for isomerizing saturated feed hydrocarbons which comprises maintaining within a reaction zone under isomerizing conditions a column of liquid catalyst consisting essentially of a liquid mixture of oxygenated hydrocarbon and non-oxygenated hydrocarbon-metallic halide complexes containing some free metallic halide in lesser proportion than the complexes in said body, said complex mixture being preformed by reacting a metallic halide selected from the halides of metals of groups 2, 3, 4, 5 and 8 of the periodic system and a saturated paraffin hydrocarbon in the presence of a small amount of carbon monoxide and also in the presence of a small amount of hydrogen halide, introducing a stream of heated feed hydrocarbons to the bottom portion of said column of preformed liquid catalyst, causing the so introduced hydrocarbons to rise through the column by difference in density in the presence of hydrogen halide, effecting substantial isomerization of feed hydrocarbons during passage through the liquid catalyst column, and continuously removing from the reaction zone a stream of isomerized hydrocarbons which have passed through the catalyst column.

6. The process according to claim 5 in which the isomerization reaction is effected under a hydrogen pressure ranging from substantially above atmospheric to about 300 pounds.

7. A continuous process for isomerizing saturated feed hydrocarbons which comprises maintaining within a reaction zone under isomerizing conditions a column of liquid catalyst consisting essentially of a preformed liquid mixture of oxygenated hydrocarbon and non-oxygenated hydrocarbon-aluminum chloride complexes containing some free aluminum chloride in lesser proportion than the complexes in said mixture, said complex mixture having a specific gravity of about 1.3 to 1.4 grams per cubic centimeter and formed by reacting aluminum chloride and a saturated paraffin hydrocarbon in the presence of a small amount of carbon monoxide and also in the presence of a small amount of hydrogen chloride, introducing a stream of heated feed hydrocarbons to the bottom portion of said column of preformed liquid catalyst, causing the so introduced hydrocarbons to rise through the column by difference in density in the presence of hydrogen halide, effecting substantial isomerization of feed hydrocarbons during passage through the liquid catalyst column, and continuously removing from the reaction zone a stream of isomerized hydrocarbons which have passed through the catalyst column.

8. The process according to claim 7 in which the isomerization reaction is effected under a hydrogen pressure ranging from substantially above atmospheric to about 300 pounds.

FRANK J. MOORE.